United States Patent
Chapon et al.

(10) Patent No.: US 10,721,870 B2
(45) Date of Patent: Jul. 28, 2020

(54) BALE WRAPPING DEVICE FOR A ROUND BALER

(71) Applicant: Deere & Company, Moline, IL (US)

(72) Inventors: Emmanuel Chapon, Velet (FR);
Romain Repecaud, Arc les Gray (FR);
Pascal Gresset, Auxon Dessous (FR)

(73) Assignee: DEERE & COMPANY, Moline, IL (US)

( * ) Notice: Subject to any disclaimer, the term of this patent is extended or adjusted under 35 U.S.C. 154(b) by 251 days.

(21) Appl. No.: 15/667,384

(22) Filed: Aug. 2, 2017

(65) Prior Publication Data

US 2018/0042181 A1    Feb. 15, 2018

(30) Foreign Application Priority Data

Aug. 12, 2016    (DE) .................. 10 2016 215 085

(51) Int. Cl.
| | | |
|---|---|---|
| *A01F 15/07* | (2006.01) | |
| *A01F 15/12* | (2006.01) | |
| *A01F 15/14* | (2006.01) | |
| *B65B 41/12* | (2006.01) | |
| *F16D 49/10* | (2006.01) | |

(52) U.S. Cl.
CPC .......... *A01F 15/0715* (2013.01); *A01F 15/12* (2013.01); *A01F 15/14* (2013.01); *B65B 41/12* (2013.01); *F16D 49/10* (2013.01); *A01F 2015/075* (2013.01); *A01F 2015/0725* (2013.01)

(58) Field of Classification Search
CPC ......... B65B 63/04; B65B 41/16; B65B 41/12; A01F 15/071; A01F 15/0715; A01F 2015/072; A01F 15/14; A01F 15/12; A01F 2015/075; A01F 2015/0725; F16D 49/10
USPC ............ 53/116–118, 587, 588, 389.2, 389.4; 56/341
See application file for complete search history.

(56) References Cited

U.S. PATENT DOCUMENTS

| | | | | |
|---|---|---|---|---|
| 4,787,193 A | * | 11/1988 | Verhulst .............. | A01F 15/0715 53/118 |
| 5,692,366 A | * | 12/1997 | Hardesty ................ | A01D 34/69 180/19.3 |
| 6,164,050 A | * | 12/2000 | Vande Ryse ......... | A01D 89/004 100/88 |
| 6,622,463 B1 | * | 9/2003 | Anstey .................... | A01F 15/12 53/118 |
| 6,651,408 B1 | * | 11/2003 | McClure ............. | A01F 15/0715 242/421.2 |

(Continued)

FOREIGN PATENT DOCUMENTS

EP    2982235 A1    2/2016

OTHER PUBLICATIONS

German Search Report issued in counterpart application No. 102016215085.5, dated Mar. 21, 2017. (8 pages).

(Continued)

*Primary Examiner* — Hemant Desai
*Assistant Examiner* — Christopher Robin Kim (57) ABSTRACT

A bale wrapping device for a round baler includes a drive roll which can be brought into engagement with a wrapping material roll, and a drive and brake device connected to the drive roll. The drive and brake device is connected both to a variably tensionable drive belt and to a variably tensionable brake belt.

17 Claims, 6 Drawing Sheets

(56) References Cited

U.S. PATENT DOCUMENTS

| | | | | |
|---|---|---|---|---|
| 6,774,805 B1* | 8/2004 | Viesselmann | ....... | A01F 15/0715 |
| | | | | 340/675 |
| 7,908,822 B2* | 3/2011 | McClure | ............ | A01F 15/0715 |
| | | | | 242/535.1 |
| 7,918,069 B2* | 4/2011 | Viaud | ................ | A01F 15/0715 |
| | | | | 53/118 |
| 8,413,414 B2* | 4/2013 | Herron | ................ | A01F 15/0705 |
| | | | | 56/341 |
| 9,677,633 B2* | 6/2017 | Horner | .................... | F16D 49/10 |
| 2016/0037726 A1* | 2/2016 | Horner | .................... | F16D 65/58 |
| | | | | 56/341 |

OTHER PUBLICATIONS

European Search Report issued in counterpart application No. 17185377.3 dated Jan. 23, 2018. (7 pages).

* cited by examiner

BALE WRAPPING DEVICE FOR A ROUND BALER

CROSS-REFERENCE TO RELATED APPLICATIONS

Pursuant to 35 USC § 119, this application claims the benefit of and priority to German patent application no. 102016215085.5, filed on Aug. 12, 2016, which is herein incorporated by reference in its entirety.

FIELD OF THE DISCLOSURE

The disclosure relates to a bale wrapping device for a round baler, with a drive roll which can be brought into engagement with a wrapping material roll, and a drive and brake device connected to the drive roll.

BACKGROUND

It is known to equip round balers with a bale wrapping device, as a result of which a pressed bale is wrapped with a wrapping material and can then be ejected in wrapped form. The bale is brought into shape in a cylindrical pressing chamber of the round baler during a bale formation phase. For this purpose, crop lying on the ground is conveyed by a crop pick-up device into the pressing chamber and a cylindrical bale is shaped by arranged pressing means. The pressing chamber can be designed as a fixed pressing chamber, with cylindrically arranged pressing rollers, or else as a variable pressing chamber, with variable pressing means, for example pressing belts or pressing chains. In a wrapping material introduction phase following the bale formation phase, a wrapping material is guided from a wrapping material roll into the pressing chamber in the direction of the bale formed in the meantime and is entrained by the outer side of the bale. Wrapping material used is customarily mesh, film or twine. The rotating bale causes the wrapping material to be guided around the bale in a wrapping material wrapping phase. A wrapping material severing phase follows in which the wrapping material is severed from the bale by a cutting device before the bale is ejected in the bale ejection phase and deposited on the ground. It has turned out to be problematic to adapt the speed of the wrapping material roll to the individual phases and in particular also to allow a certain brake or acceleration force to act on the wrapping material roll such that there is an optimum wrapping material relief or wrapping material tightening for the corresponding phases. In the event of wrapping material relief and wrapping material tightening not being appropriately adapted to the phases, entanglements of the wrapping material with the pressing means or even defective wrapping material severings may occur, which, under some circumstances would interfere with or even interrupt the baling process. It is therefore sought to provide a bale wrapping device for a round baler, with which a round baler is operable with an optimizable wrapping material relief and with an optimizable wrapping material tightening in the individual phases mentioned of a baling process.

SUMMARY

In this regard, a bale wrapping device is designed in such a manner that the drive and brake device is in connection both with a variably tensionable drive belt and with a variably tensionable brake belt. By means of the variably tensionable drive belt and the variably tensionable brake belt, an interaction can be produced between the belts, said interaction permitting a baling-phase-dependent optimization of the wrapping material relief or wrapping material tension, wherein the drive and brake device connected to the drive roll is acted upon in such a manner that the drive roll is subjected to a drive torque during the wrapping material introduction phase, and therefore wrapping material is dispensed and can be guided into the baling chamber. In the subsequent wrapping material wrapping phase, a brake torque can then be introduced for the drive roll, as a result of which the wrapping material roll is braked and the wrapping material entrained or pulled along by the bale is tensioned. In the subsequent phase, in turn, the brake torque can be adapted to the wrapping material severing phase, and therefore wrapping material severing with optimized wrapping material tension can take place. The variably tensionable drive and brake belts make it possible for drive and/or brake torques which are adjustable independently of one another in various operating positions for the bale wrapping device to be realized at the drive and brake device or at the drive roll.

The drive and brake device can include a combined drive and brake drum, wherein the combined drive and brake drum is connected to the drive roll for rotation therewith, and is also in connection with the drive belt and with the brake belt. The drive and brake drum can be formed here as a single-part drum or pulley with two parallel belt guides, or, for example, also by means of two pulleys connected to each other for rotation with each other. Via the connection of the drive and brake drum to the drive roll for rotation therewith, the latter can be driven via the drive belt and at the same time can also be braked via the brake belt, and therefore a variable rotational speed of the drive and brake drum is produced via an adjustable engagement action of drive and brake belts.

The drive and brake device can furthermore include an actuable adjustment apparatus acting on the drive belt. A belt tension for the drive belt can be provided via the adjustment apparatus, and therefore the drive belt is tensionable variably into different states of tension. A drive torque acting on the drive and brake drum can be initiated variably via the state of tension of the drive belt.

Furthermore, the drive and brake device can include an actuable tensioning apparatus acting on the brake belt. A belt tension for the brake belt can be provided via the tensioning apparatus, and therefore the brake belt is tensionable variably into different states of tension. A brake torque acting on the drive and brake drum can be initiated variably via the state of tension of the brake belt.

The adjustment apparatus acting on the drive belt and the tensioning apparatus acting on the brake belt are preferably in connection with each other, wherein, by actuation of the adjustment apparatus acting on the drive belt, the tensioning apparatus acting on the brake belt is actuable. The connection of the adjustment apparatus and tensioning apparatus can take place by means of mechanical, hydraulic or else electric adjustment means which are in mechanical connection with one another. It is also conceivable to produce a non-mechanical connection between the adjustment apparatus and the tensioning apparatus via electronic means, and therefore, for example, the two apparatuses are actuable via adjustment means which are in each case mechanically separated from one another but are activatable electronically. In the sense of a connection, the adjustment apparatus and the tensioning apparatus are then in connection with each other by means of an electronic controller, and therefore the tensioning apparatus would be activated electronically depending on the adjustment apparatus.

The drive belt can be in engagement on the input side with a belt drive roll, wherein the latter is connected to drive means. Driven components, in particular directly or indirectly driven pressing rollers of the round baler can serve as drive means in such a manner that, for example, the belt drive roll is connected to one of the pressing rollers for rotation therewith. It is also conceivable here to select a separate drive, i.e. a drive which is separate from the pressing rollers for the belt drive roll, for example an electric motor which is activatable depending on various operating phases of a round baler, in particular in a wrapping material introduction phase, a wrapping material wrapping phase and/or a wrapping material severing phase.

A freewheeling device can be provided in such a manner that the belt drive roll can run ahead of drive means for the belt drive roll in the drive direction of rotation. The belt drive roll is connected, for example, to a freewheeling device in such a manner that it can run ahead of a driven pressing roller driving the belt drive roll, or can have a higher RPM and is only connected in the opposite direction to the pressing roller for rotation therewith.

The abovementioned adjustment apparatus for the drive belt is preferably activatable via an actuator depending on various operating phases for a round baler, wherein the operating phases include at least one wrapping material introduction phase, a wrapping material wrapping phase and a wrapping material severing phase. The actuator can be designed in the form of an electronically or mechanically activatable hydraulic cylinder or electric motor. Furthermore, the tensioning apparatus acting on the brake belt can also be brought into an activated or deactivated operating state, for example by a lever tensioning apparatus by means of tensioning levers, by means of which the brake belt is brought out of an operating state into a non-operating state, wherein the brake belt is tensioned more tightly around the drive and brake drum in the operating state than in the non-operating state, or the brake belt is released from the drive and brake drum in the non-operating state.

The above-described bale wrapping device is preferably used in round balers for agricultural crop.

A round baler with the abovementioned bale wrapping device is preferably operated according to a method which provides that in a wrapping material introduction phase in which the wrapping material is supplied to the baling chamber of a round baler, the drive and brake device is operated with a first brake torque on the part of the brake belt, in a wrapping material wrapping phase in which the wrapping material is wrapped around the bale in the baling chamber, is operated with a second brake torque on the part of the brake belt, and, in a wrapping material severing phase in which the wrapping material wrapped around the round bale is severed from the wrapping material roll by a cutting device, is operated with a third brake torque on the part of the brake belt. On the other hand, the drive and brake device is operated on the part of the drive belt with a first drive torque in the wrapping material introduction phase, with a second drive torque in the wrapping material wrapping phase and with a third drive torque in the wrapping material severing phase. The bale wrapping device is accordingly operated with different drive or brake torques acting on the drive and brake drum in various operating positions in accordance with the various operating phases mentioned. This gives rise to different drive torques or brake torques or speeds of rotation for a wrapping material roll in engagement with the drive roll, as a result of which different wrapping material states of tension can be obtained when unrolling the wrapping material from the wrapping material roll in the different operating phases of the baler. The wrapping material state of tension is produced here from the extent of the braking of the wrapping material roll by the drive roll in relation to the unrolling speed of the wrapping material from the wrapping material roll, said unrolling speed arising by means of the rotation of the bale as the wrapping material is carried along by the bale.

It can be provided here that the first brake torque is smaller than the second brake torque and/or the first brake torque is smaller than the third brake torque and/or that the third brake torque is not equal to the second brake torque.

The disclosure and further advantages and advantageous developments and refinements of the disclosure are described and explained in more detail below with reference to the drawing which shows an exemplary embodiment of the disclosure.

DETAILED DESCRIPTION

Figure 1:
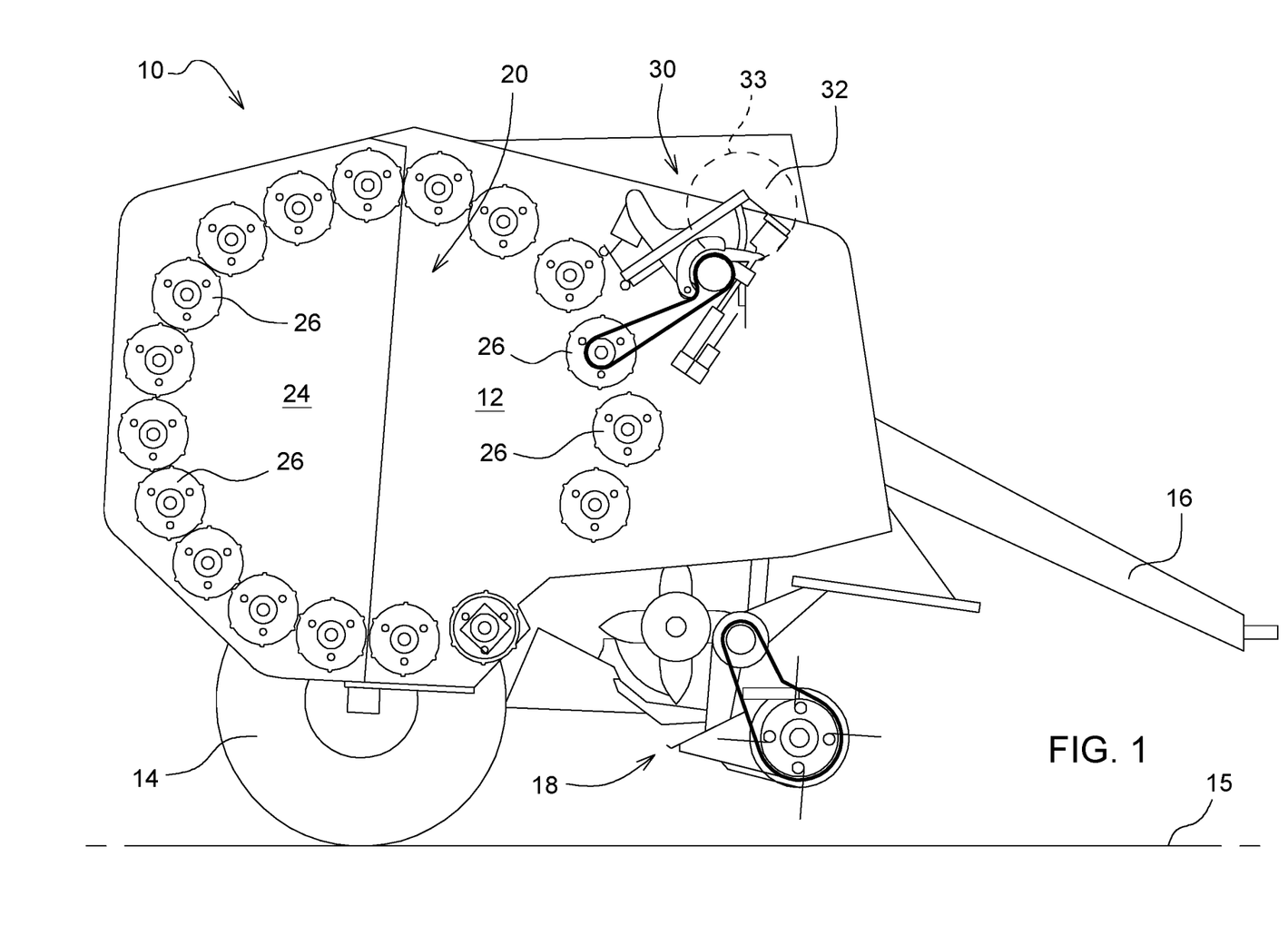
FIG. 1 shows a schematic side view of a round baler with a bale wrapping device.
Figure 2:
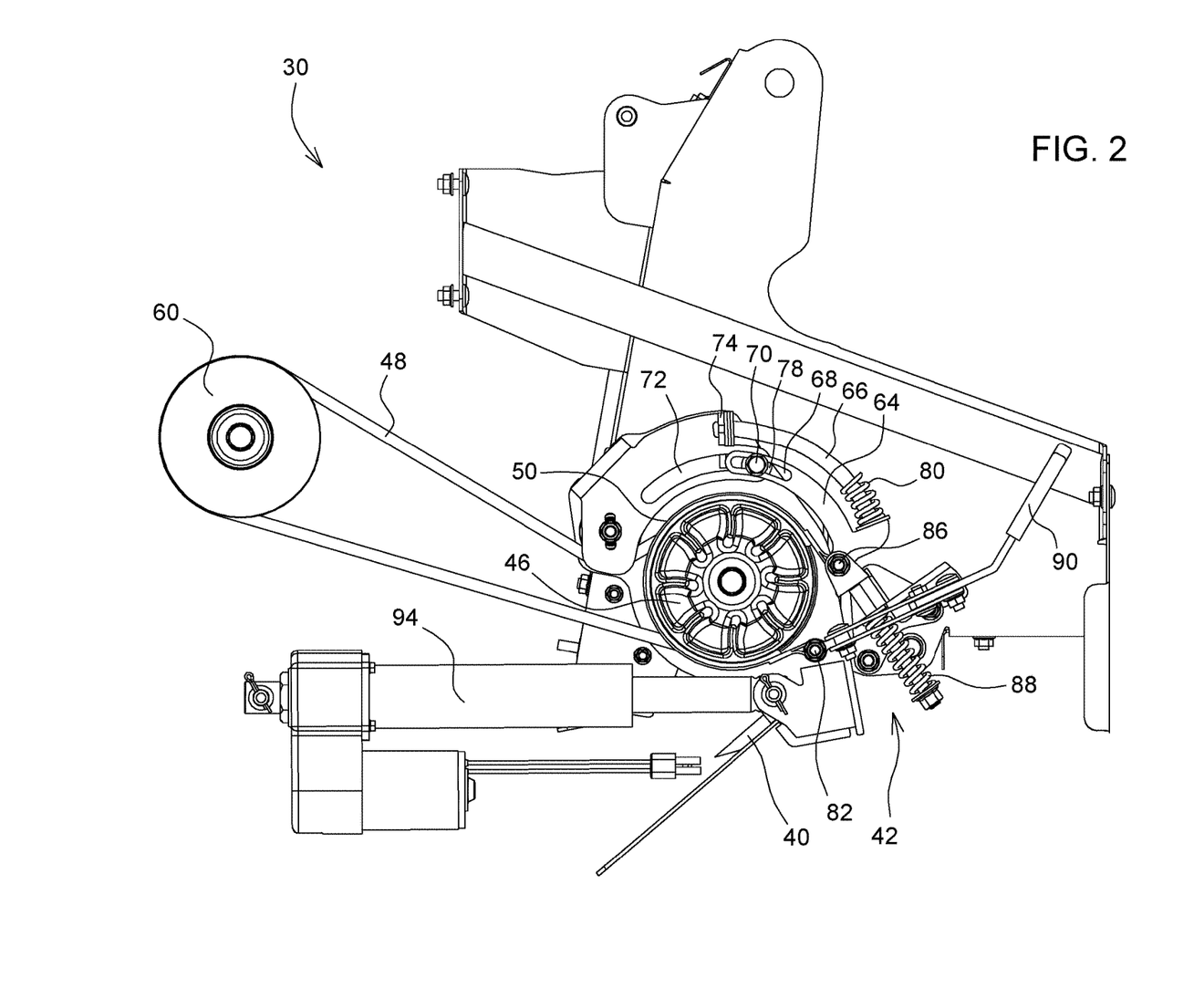
FIG. 2 shows an enlarged schematic side view of the bale wrapping device from FIG. 1 in an operating position for a wrapping material introduction phase.
Figure 3:
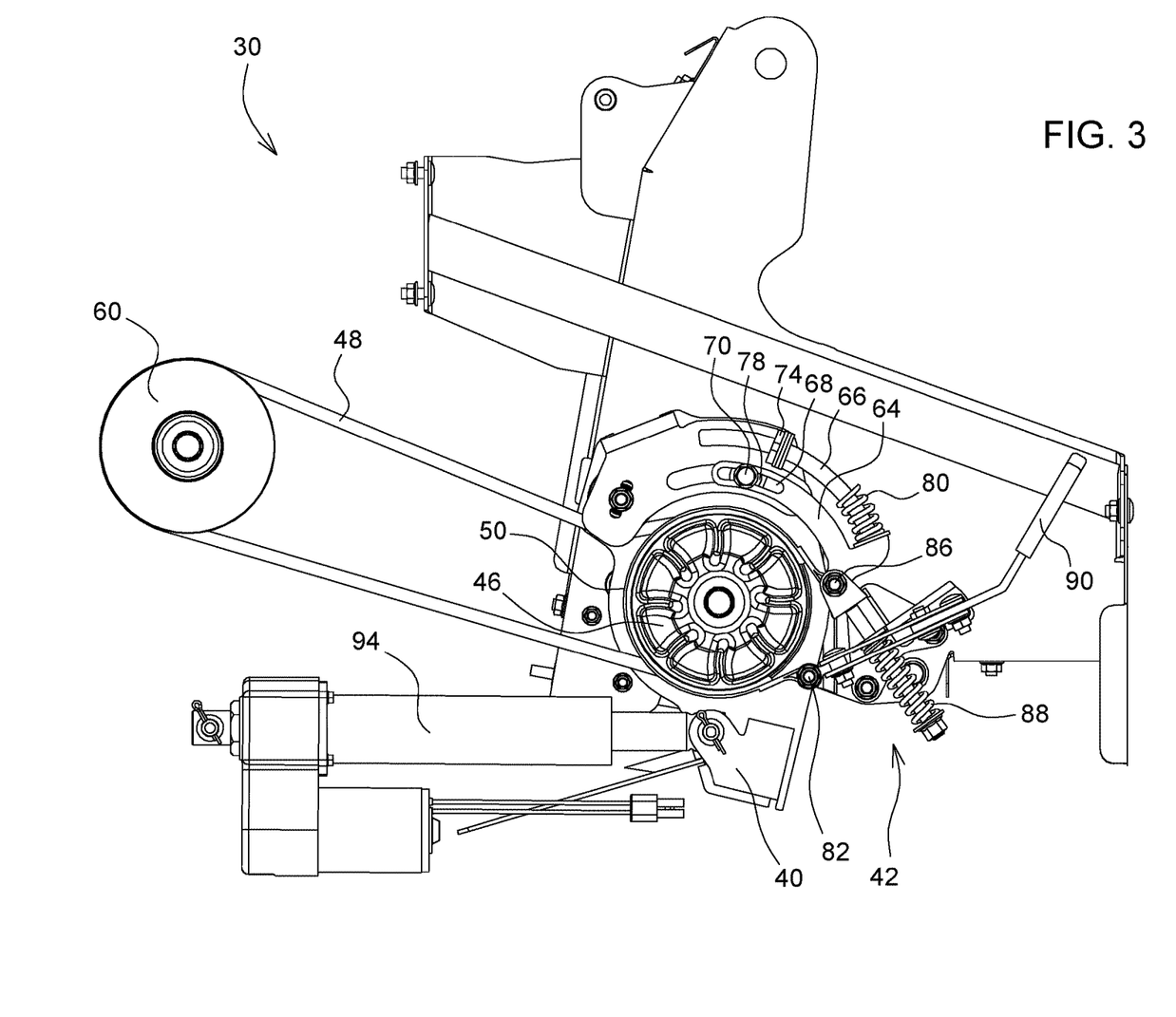
FIG. 3 shows an enlarged schematic side view of the bale wrapping device from FIG. 1 in an operating position for a wrapping material wrapping phase.
Figure 4:
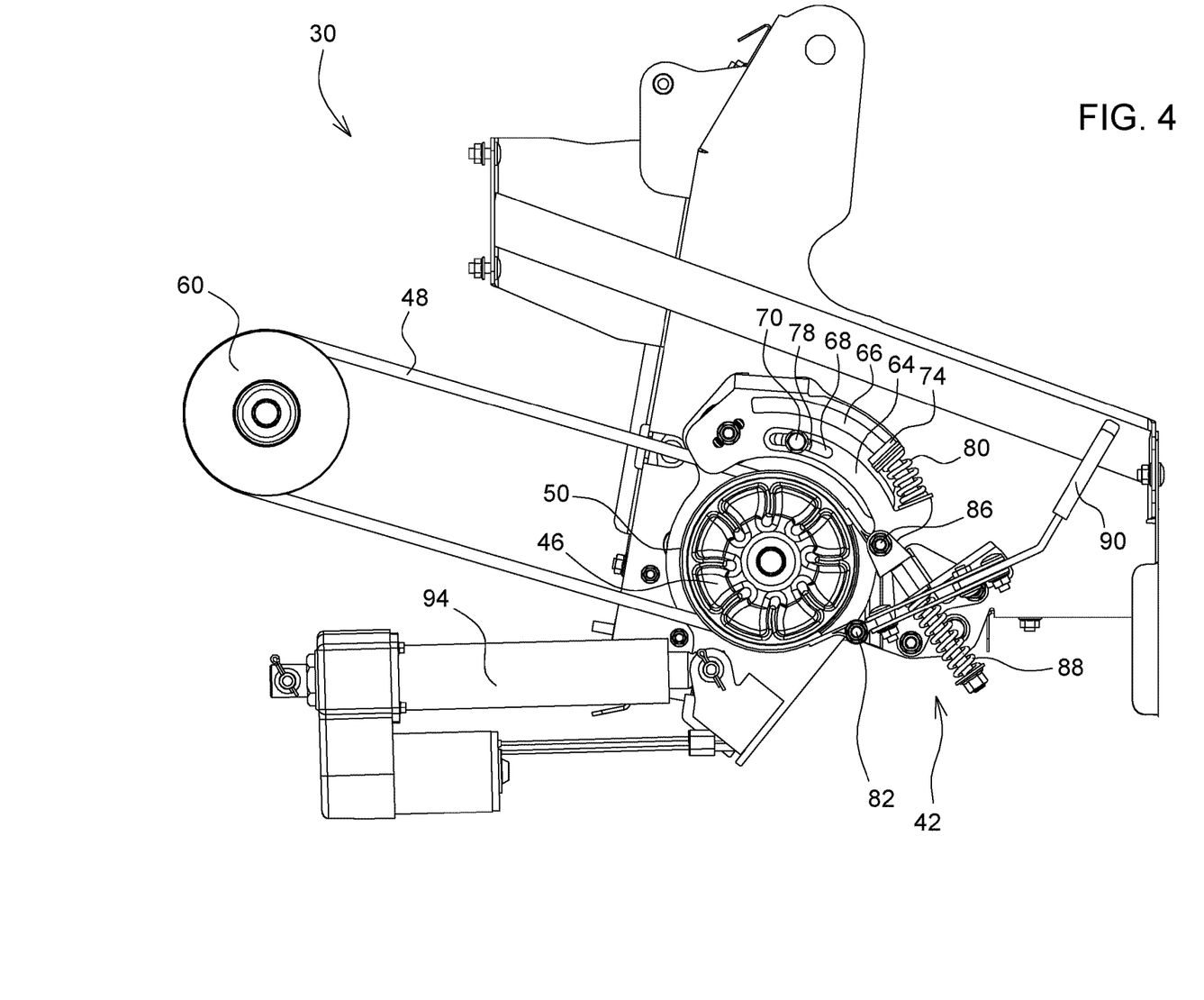
FIG. 4 shows an enlarged schematic side view of the bale wrapping device from FIG. 1 in an operating position for a wrapping material severing phase.

A round baler 10 which is illustrated schematically in FIG. 1 includes a first housing part 12 which is supported on a ground 15 by means of wheels 14 and is connectable by means of a drawbar 16 to a towing vehicle (not shown), for example a tractor.

A pick-up and conveying device 18 for crop is located in a known manner on a front lower side of the first housing part 12 in the forwards direction of travel, wherein the first housing part 12 surrounds a front part of a baling space 20. Located at the rear upper corner region of the first housing part 12 is a bearing (not shown) for a pivotable second housing part 24 which surrounds a rear part of the baling space 20. In the open state (not shown), the second housing part 24 opens up an outlet (not shown) through which a bale (not shown) pressed by the round baler 10 can be deposited or unloaded or discharged. The pivotable second housing part 24 can be actuated (opened and closed) by means of servomotors (not shown) and therefore constitutes an outlet flap for a bale pressed in the baling space 20.

The round baler 10, designed with a size-invariable baling space 20, contains a multiplicity of pressing elements, which run parallel to one another and are intended for pressing crop, in the form of pressing rollers 26 (just a few pressing rollers 26 have been provided here with the reference sign "26" as an example), the axes of rotation of which are placed on a circular arc when the second housing part 24 is closed, and of which at least some are driven. Alternatively, the round baler 10 can also be designed in a known manner as such with a size-variable baling space 20 or as a round baler 10 with a variable baling space 20, wherein the pressing elements can then be designed, likewise in a known manner, as belts, straps or chain arrangements (not shown).

Furthermore, the round baler 10 includes a bale wrapping device 30 which is equipped with a wrapping material roll 32. Mesh, film or else twine can be used as the wrapping material 33. The bale wrapping device 30 furthermore includes a supply device (not shown) for the wrapping material, by means of which the wrapping material 33 is guided from the wrapping material roll 32 into the baling space 20.

After the actual pressing operation, i.e. the pickup of crop and formation of a round bale by the pressing rollers 26, is finished, the bale wrapping device 30 is activated, and a wrapping operation following the pressing operation is initiated.

When a wrapping operation is initiated, wrapping material is guided in the direction of the pressing chamber 20 by a mechanically triggered supply movement in a wrapping material introduction phase, and therefore a free wrapping material end can come into contact with the round bale rotating in the pressing chamber 20, and the wrapping material 33 is entrained and picked up. By rotation of the round bale, the wrapping material 33 is wrapped in one or more layers around the circumference of the round bale in a wrapping material wrapping phase. The wrapping operation is finished by a wrapping material severing phase in which the wrapping material 33 wrapped around the round bale is severed from the wrapping material roll 32 by a cutting device 40.

As is also illustrated in detail in FIGS. 2 to 6, the bale wrapping device 30 includes a drive and brake device 42 which is connected to a drive roll 44. The drive roll 44 is in engagement with the wrapping material roll 32, or is in a frictional connection therewith as depicted schematically by dashed lines in FIG. 6.

The drive and brake device 42 furthermore includes a combined drive and brake drum 46 which is in connection both with a variably tensionable drive belt 48 and with a variably tensionable brake belt 50. The drive and brake drum 46 is connected to the drive roll 44 for rotation therewith and is furthermore in connection with the drive belt 48 and with the brake belt 50.

The drive and brake device 42 includes an adjustment apparatus 52 which is actuable or is adjustable in the circumferential direction of the drive and brake drum 46, acts on the drive belt 48 and includes a disc-shaped adjustment body 54 and a guide part 56. The guide part 56 extends from the adjustment body 54 in a manner spaced apart radially from the drive and brake drum 46 and partially surrounds the latter in the circumferential direction, wherein a tensioning roll 58 which interacts with the drive belt 48 is mounted on the guide part 56.

The drive belt 48 is placed on one side around a belt drive roll 60 which is in connection with the drive element for rotation therewith. One of the pressing rollers 26 which is set into rotation by the bale during the bale formation process serves here as the drive element. On that side of the drive belt 48 which lies opposite the one side, said drive belt is placed around the drive and brake drum 46. The drive belt can be brought into different states of tension by means of the tensioning roll 58, wherein the tensioning roll 58 is pressed onto the drive belt under differing strength depending on the position of the adjustment body 54 in the circumferential direction of the drive and brake drum 46, as is illustrated in particular in FIGS. 2 to 4. Depending thereon, different drive torques are transmitted from the belt drive roll 60 to the drive and brake drum 46 by the changing frictional connection between belt drive roll 60 and drive belt 48 or between drive and brake drum 46 and drive belt 48.

The bale wrapping device 30 furthermore includes a tensioning apparatus 62 which is actuable, acts on the brake belt 50, likewise extends adjustably in the circumferential direction of the drive and brake drum 46 and partially surrounds the latter in the circumferential direction. The tensioning apparatus 62 is connected to the adjustment body 54, and therefore the tensioning apparatus 62 is likewise adjustable by adjustment of the adjustment body 54. Furthermore, the tensioning apparatus 62 is guided on the adjustment body, wherein the adjustment body 54 is adjustable in the circumferential direction in relation to the tensioning apparatus 62. For this purpose, the tensioning apparatus 62 has a first curved guide arm 64 and a second curved guide arm 66. The two guide arms 64, 66 run parallel to each other in the circumferential direction of the drive and brake drum 46. The first guide arm 64 is provided with a curved groove 68 in which an adjustment nut 70 is adjustably fixed. The adjustment nut 68 is furthermore guided displaceably in a likewise curved adjustment groove 72, wherein the adjustment groove 72 is formed in the adjustment body 54 and runs parallel to the groove 68 of the first guide arm 64 of the tensioning apparatus 62, as is depicted in FIGS. 2 to 6. The second guide arm 66 is in engagement with a tab 74 extending from the adjustment body 54, wherein the tab 74 has an opening 76 through which the guide arm 66 is guided (see FIG. 5). The adjustment screw 70 constitutes a stop which comes into abutment against one end 78 of the adjustment groove 72 when the adjustment body 54 is adjusted anticlockwise in the circumferential direction in relation to the tensioning apparatus 62 into a first extreme position according to FIG. 2. The tab 74 constitutes a stop which comes into abutment on a spiral spring 80 arranged on the guide arm 66 when the adjustment body 54 is adjusted in the clockwise direction in the circumferential direction in relation to the tensioning apparatus 62 into a second extreme position according to FIG. 4 or 5 (see FIG. 5). As becomes clear in FIGS. 2 to 4, in the first extreme position, the tensioning roll 58 is set to a maximum extent against the drive belt 48, and therefore the latter is operated at maximum tension in the first extreme position of the adjustment body 54. By contrast, in the second extreme position of the adjustment body 54, the tensioning roll 58 is set to a minimum extent against the drive belt 48, namely is released therefrom, and therefore the drive belt 48 is operated without or with a minimum tension.

The brake belt 50 is fastened at a first end 82 to a tensioning lever device 84 fixed to the frame of the round baler 10, is placed around the drive and brake drum 46 and is connected at a second end 86 to the tensioning apparatus 62. The tensioning apparatus 62 is pretensioned in relation to the frame of the round baler 10 by means of a tensioning spring 88 and is adjusted in such a manner that the tensioning apparatus 62 is held in a pretensioning position (according to FIG. 3) in which the adjustment screw 70 is placed in a central region of the adjustment groove 72 and the brake belt 50 is tensioned with a corresponding basic belt tension around the drive and brake drum 46. The tensioning apparatus 62 is therefore moved out of its pretensioning position by the above-described interaction with the adjustment body 54 by either the tab 74 acting on the brake belt 50 via the spiral spring 80 and the belt tension being increased in the clockwise direction by movement of the tensioning apparatus 62, or by the adjustment screw 70 coming into abutment against the end 78 of the adjustment groove 72 and the belt tension being reduced by movement of the tensioning apparatus 62 anticlockwise.

Figure 5:
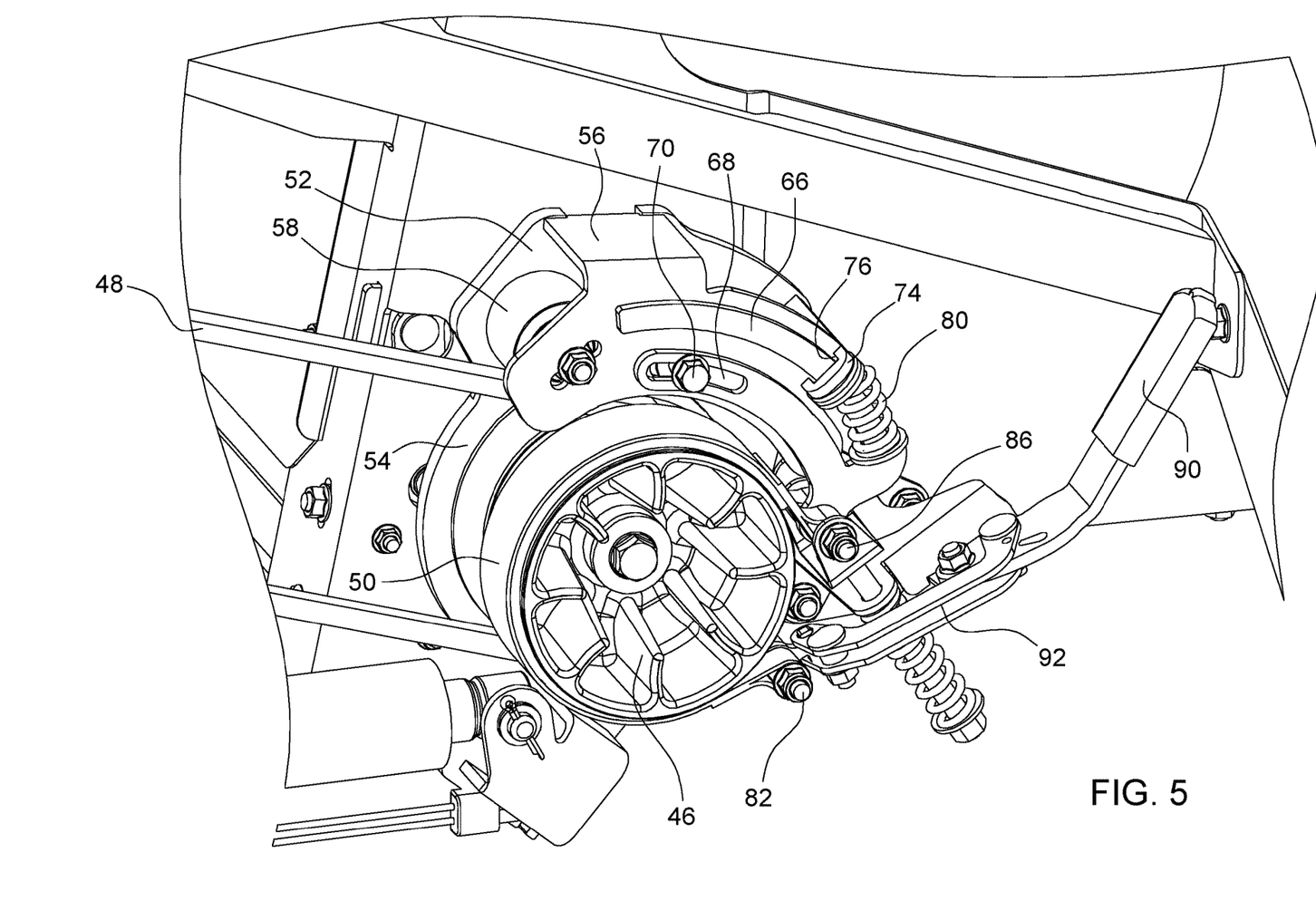
FIG. 5 shows a further enlarged schematic side view of the bale wrapping device from FIG. 1 with a tensioning lever device for a brake belt in a tensioned operating state.
Figure 6:
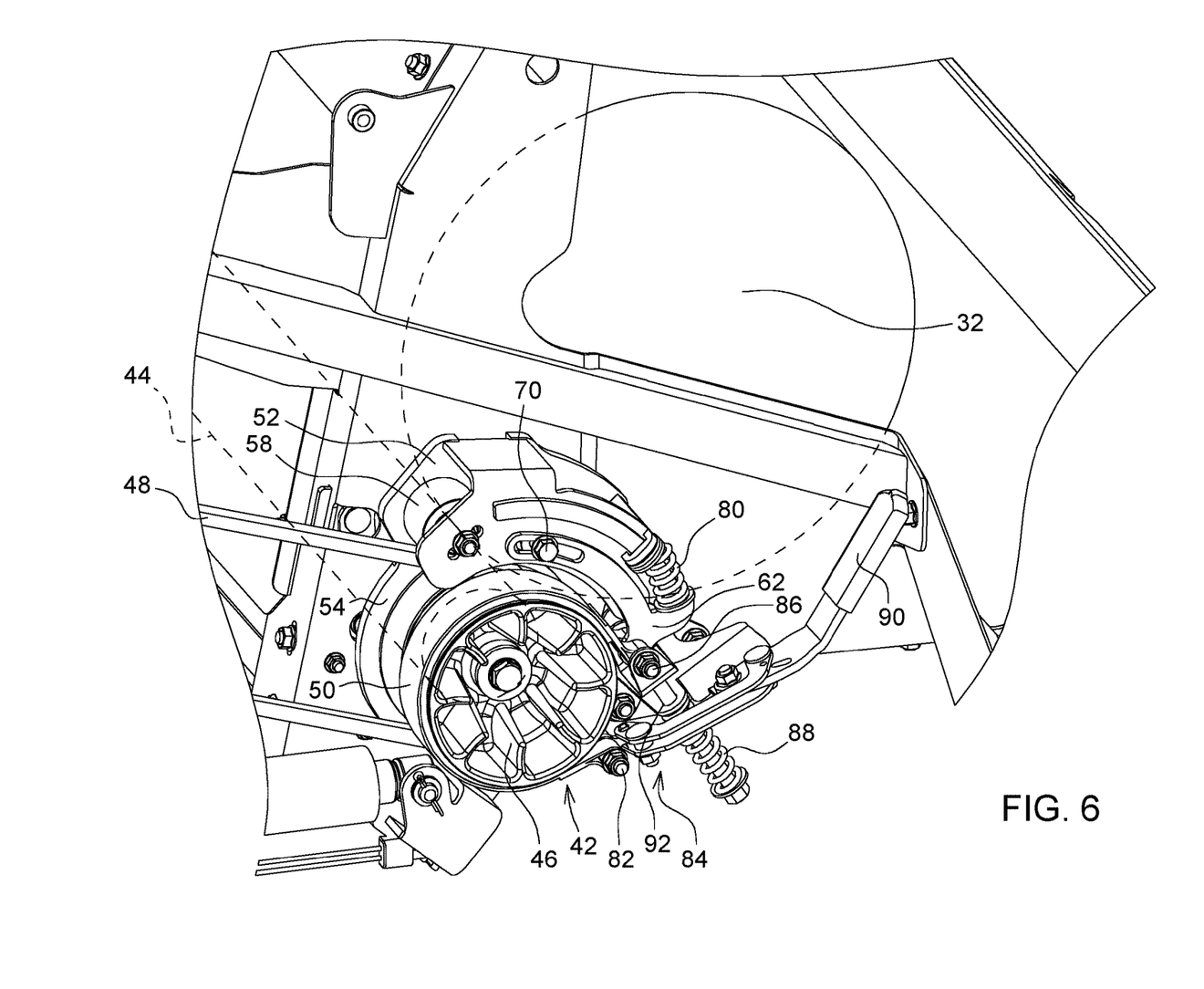
FIG. 6 shows a further enlarged schematic side view of the bale wrapping device from FIG. 1 with the tensioning lever device for the brake belt in a deactivated operating state.

As is depicted in particular in FIGS. 5 and 6, the tensioning lever device 84 includes a tensioning lever 90 which is actuable manually and interacts with a lever linkage 92 via which the brake belt 50 can be released from the drive and brake drum 46 (FIG. 6) by the first end 82 of the brake belt 50 being correspondingly shifted. The tensioning lever device 84 is required, for example, in order to bring the drive roll 44 to idling during a change of the wrapping material roll 32. For this purpose, the tensioning lever device 84 is brought out of a tensioning position according to FIGS. 2 to 5 into a released position by manual actuation of the tensioning lever 90 and the basic belt tension at the brake belt 50 is removed (see FIG. 6).

Furthermore, a freewheeling device (not shown) is provided between the drive means connected to the belt drive roll 60 and the belt drive roll 60 so that it is ensured that drive means and drive roll 44 can take up different rotational speeds. This will occur, for example, if, in the wrapping material wrapping phase, the round bale drives the drive element, in particular one of the pressing rollers 26, at a first rotational speed and at the same time entrains the wrapping material such that the wrapping material roll 32 takes up a relatively high unrolling rotational speed. The drive roll 44 which is in engagement with the wrapping material roll 32, because of its lower diameter, takes up an even higher rotational speed which, in turn, can turn out to be higher than the rotational speed of the drive means or than that of the relevant pressing roller 26.

It is virtually ensured by means of the freewheeling that the belt drive roll 60 can be operated in this state and can run ahead of the drive means in the drive direction of rotation or can have a higher rotational speed, and only in the opposite direction is connected to the pressing roller 26 for rotation therewith.

The adjustment apparatus 52 is furthermore activatable via an actuator 94 depending on operating phases of the round baler 10, wherein the operating phases include at least a wrapping material introduction phase, a wrapping material wrapping phase and a wrapping material severing phase. The actuator 94 is connected to an electric control unit (not shown) which, by means of suitable sensors, generates control signals corresponding to the operating phases which occur and activates the actuator 94 for adjusting the adjustment apparatus 52 depending on said control signals.

The method for operating the round baler 10 provides that, in a wrapping material introduction phase in which the wrapping material 33 is supplied to the baling chamber 20, the drive and brake device 42 is operated with a first brake torque on the part of the brake belt 50, in a wrapping material wrapping phase in which the wrapping material 33 is wrapped around the bale in the baling chamber 20, is operated with a second brake torque on the part of the brake belt 50, and, in a wrapping material severing phase in which the wrapping material 33 wrapped around the round bale is severed from the wrapping material roll 32 by the cutting device 40, is operated with a third brake torque on the part of the brake belt 50.

It is furthermore provided that the first brake torque is smaller than the second and/or the third brake torque, wherein the third brake torque can also be not equal to the second brake torque. The above-explained arrangement of a bale wrapping device ensures that the wrapping material 33 can be introduced with little tension or free from tension into the pressing space 20 in the wrapping material introduction phase. Furthermore, the wrapping material 33 can be under a certain higher basic tension in the wrapping material wrapping phase, and the tension on the wrapping material 33 can be increased even further or optionally also reduced in the wrapping material severing phase.

The invention claimed is:

1. A bale wrapping device for a round baler, comprising:
   a drive roll which can be brought into engagement with a wrapping material roll; and
   a drive and brake drum connected to and rotatable with the drive roll;
   a drive belt placed around the drive and brake drum;
   a brake belt placed around the drive and brake drum;
   an adjustment apparatus acting on the drive belt and operable to adjust a tension of the drive belt and a frictional connection between the drive belt and the drive and brake drum;
   a tensioning apparatus acting on the brake belt and operable to adjust a tension of the brake belt and a brake torque between the brake belt and the drive and brake drum;
   wherein the adjustment apparatus includes an adjustment body and a guide part extending radially from the adjustment body relative to the drive and brake drum, wherein the adjustment body and the guide part are partially disposed circumferentially around the drive and brake drum;
   wherein the tensioning apparatus is partially disposed circumferentially around the drive and brake drum, and is actuable in a circumferential direction of the drive and brake drum;
   wherein the tensioning apparatus includes a first curved guide arm and a second curved guide arm disposed parallel to each other and extending in the circumferential direction of the drive and brake drum;
   wherein the first curved guide arm includes a curved groove, and the adjustment body includes an adjustment groove; and
   wherein the tensioning apparatus includes an adjustment nut disposed engaging the curved groove of the first guide arm and the adjustment groove of the adjustment body.

2. The bale wrapping device of claim 1, wherein the adjustment apparatus acting on the drive belt and the tensioning apparatus acting on the brake belt are in connection with each other and, by actuation of the adjustment apparatus acting on the drive belt, the tensioning apparatus acting on the brake belt is actuable.

3. The bale wrapping device of claim 1, wherein the drive belt is in engagement with a belt drive roll which is connectable to a drive means.

4. The bale wrapping device of claim 3, wherein a freewheeling device is provided in such a manner that the belt drive roll can run ahead of drive means for the belt drive roll in the drive direction of rotation.

5. The bale wrapping device of claim 1, wherein the adjustment apparatus is activatable via an actuator depending on operating phases, wherein the operating phases comprise at least one of a wrapping material introduction phase, a wrapping material wrapping phase, and a wrapping material severing phase.

6. The bale wrapping device of claim 1, wherein the adjustment body and the guide part are actuable in a circumferential direction of the drive and brake drum to adjust the tension of the drive belt and the frictional connection between the drive belt and the drive and brake drum.

7. The bale wrapping device of claim 6, wherein the guide part supports a tensioning roll that is engaged with the drive belt.

8. The bale wrapping device of claim 1, wherein the tensioning apparatus includes a tab extending from the adjustment body and defining an opening.

9. The bale wrapping device of claim 8, wherein the second guide arm extends through the opening in the tab.

10. A round baler having a bale wrapping device, the round baler comprising:
   a drive roll which can be brought into engagement with a wrapping material roll;
   a drive and brake drum connected to and rotatable with the drive roll;
   a belt drive roll drivingly connected to a drive means for rotation;
   a drive belt placed around the drive and brake drum and the belt drive roll;
   an adjustment apparatus acting on the drive belt, wherein the adjustment apparatus includes an adjustment body partially disposed circumferentially around the drive and brake drum, and wherein the adjustment body is adjustable in the circumferential direction of the drive and brake drum to adjust the tension of the drive belt and a frictional connection between the drive belt and the drive and brake drum;
   a tensioning apparatus acting on the brake belt, wherein the tensioning apparatus is partially disposed circumferentially around the drive and brake drum, and wherein the tensioning apparatus is adjustable in the circumferential direction of the drive and brake drum to adjust a tension of the brake belt and a brake torque between the brake belt and the drive and brake drum;
   wherein the adjustment apparatus includes a guide part extending radially from the adjustment body relative to the drive and brake drum, wherein the guide part is partially disposed circumferentially around the drive and brake drum;
   wherein the tensioning apparatus includes a first curved guide arm and a second curved guide arm disposed parallel to each other and extending in the circumferential direction of the drive and brake drum;
   wherein the first curved guide arm includes a curved groove, and the adjustment body includes an adjustment groove; and
   wherein the tensioning apparatus includes an adjustment nut disposed engaging the curved groove of the first guide arm and the adjustment groove of the adjustment body.

11. The round baler of claim 10, wherein the adjustment apparatus acting on the drive belt and the tensioning apparatus acting on the brake belt are in connection with each other and, by actuation of the adjustment apparatus acting on the drive belt, the tensioning apparatus acting on the brake belt is actuable.

12. The round baler of claim 10, wherein a freewheeling device is provided in such a manner that the belt drive roll can run ahead of drive means for the belt drive roll in the drive direction of rotation.

13. The round baler of claim 10, wherein the adjustment apparatus is activatable via an actuator depending on operating phases, wherein the operating phases comprise at least one wrapping material introduction phase, a wrapping material wrapping phase, and a wrapping material severing phase.

14. A bale wrapping device for a round baler, the bale wrapping device comprising:
   a drive and brake drum configured for attachment to a drive roll;
   a drive belt placed around the drive and brake drum;
   a brake belt placed around the drive and brake drum;
   an adjustment body partially disposed circumferentially around the drive and brake drum and defining an adjustment groove;
   wherein the adjustment body supports a tensioning roll in pressing engagement with the drive belt and is actuable for adjusting tension in the drive belt;
   a tensioning apparatus coupled to the brake belt and having a first curved guide arm extending in a circumferential direction of the drive and brake drum, wherein the first curved guide arm defines a curved groove;
   an adjustment nut disposed within the curved groove of the first guide arm and the adjustment groove of the adjustment body and interconnecting the first guide arm and the adjustment body, such that actuation of the adjustment body actuates the tensioning apparatus for adjusting a tension in the brake belt.

15. The bale wrapping device set forth in claim 14, wherein the adjustment body includes a tab defining an opening.

16. The bale wrapping device set forth in claim 15, wherein the tensioning apparatus includes a second curved guide arm extending in the circumferential direction of the drive and brake drum, and extending through the opening in the tab of the adjustment body.

17. The bale wrapping device set forth in claim 16, further comprising a spring disposed bout the second curved guide arm and operable to engage the tab of the adjustment body at a limit of movement of the adjustment body.

* * * * *